US006957872B2

(12) United States Patent
Moradmand et al.

(10) Patent No.: US 6,957,872 B2
(45) Date of Patent: Oct. 25, 2005

(54) INTEGRATED PRE-CHARGE FOR CONTROLLED BRAKE SYSTEMS

(75) Inventors: Jamshid K. Moradmand, Dayton, OH (US); E. Wayne Lloyd, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/766,050

(22) Filed: Jan. 28, 2004

(65) Prior Publication Data

US 2005/0162011 A1 Jul. 28, 2005

(51) Int. Cl.⁷ .............................................. B60T 8/40
(52) U.S. Cl. ................................. 303/116.2; 303/116.4
(58) Field of Search .............................. 417/273, 288, 417/383, 428, 206; 303/10, 11, 113.1–113.5, 303/116.1–116.2, 116.4

(56) References Cited

U.S. PATENT DOCUMENTS

| | | | | |
|---|---|---|---|---|
| 3,614,267 A | * | 10/1971 | Schultze et al. | 417/206 |
| 4,332,532 A | | 6/1982 | Liska | 417/273 |
| 4,475,870 A | * | 10/1984 | Eickmann | 417/206 |
| 4,721,346 A | * | 1/1988 | Hurst et al. | 303/115.6 |
| 4,840,544 A | * | 6/1989 | Kuromitsu et al. | 417/254 |
| 5,078,458 A | * | 1/1992 | Budecker et al. | 303/116.4 |
| 5,192,120 A | | 3/1993 | Reinartz et al. | 303/113.2 |
| 5,340,285 A | | 8/1994 | Reinartz et al. | 417/221 |
| 5,348,382 A | | 9/1994 | Ebaugh et al. | 303/116.4 |
| 5,383,718 A | * | 1/1995 | Burgdorf et al. | 303/113.2 |
| 5,465,817 A | | 11/1995 | Muscatell | 188/295 |
| 5,564,909 A | | 10/1996 | Rischen et al. | 417/273 |
| 5,927,824 A | * | 7/1999 | Pahl et al. | 303/113.2 |
| 5,992,944 A | * | 11/1999 | Hara | 303/10 |
| 6,074,018 A | * | 6/2000 | Zeiner et al. | 303/116.1 |
| 6,158,326 A | | 12/2000 | Burgdorf et al. | 92/72 |
| 6,168,245 B1 | * | 1/2001 | Siegel et al. | 303/115.4 |
| 6,199,962 B1 | * | 3/2001 | Dokas et al. | 303/116.4 |
| 6,234,588 B1 | * | 5/2001 | Sawada | 303/119.1 |
| 6,286,914 B1 | * | 9/2001 | Sawada et al. | 303/113.2 |
| 6,386,842 B1 | * | 5/2002 | Reuter et al. | 417/417 |
| 6,579,073 B1 | | 6/2003 | Burgdorf et al. | 417/273 |
| 6,616,420 B2 | | 9/2003 | Alaze et al. | 417/273 |
| 6,648,614 B1 | * | 11/2003 | Hinz et al. | 417/470 |
| 6,817,838 B2 | * | 11/2004 | Mori | 417/244 |
| 2003/0234574 A1 | * | 12/2003 | Reuter et al. | 303/116.2 |

* cited by examiner

*Primary Examiner*—Chris Schwartz
(74) *Attorney, Agent, or Firm*—Michael D. Smith

(57) ABSTRACT

First and second pumps are integral in that the pumps are driven by a common motor. The first pump is driven in pumping motion by an eccentric disposed on the motor shaft and the second pump is driven in pumping motion by an end of the motor shaft. The first pump can be an ABS pump and the second pump can be a pre-charge pump. The first and second pumps can be disposed in a common block housing and the common block housing can define a fluid path extending from the outlet of the second pump to the inlet of the first pump. A third pump can be susbtantially similar to the first pump and be disposed on an opposite side of the shaft as the first pump. The third pump can be driven in pumping motion by the eccentric. A separate feed line can be directed from the reservoir of the brake system to the second pump to improve performance.

4 Claims, 2 Drawing Sheets

INTEGRATED PRE-CHARGE FOR CONTROLLED BRAKE SYSTEMS

TECHNICAL FIELD

The invention provides a pump for delivering brake fluid to the brakes of a vehicle and, more specifically, the invention provides a pre-charge pump for pumping fluid to an anti-lock brake pump.

BACKGROUND OF THE INVENTION

A vehicle braking system can include a pre-charge pump that directs fluid to a second pump of the braking system. The second pump can be an anti-lock brake system or ABS pump. It can be desirable to include a pre-charge pump in the braking system to enhance the response of controlled braking. For example, the pre-charge pump can enhance the pressurization of fluid by the ABS pump by increasing the likelihood that the ABS pump will quickly draw a desired amount of brake fluid to pressurize and deliver to the brakes. The pre-charge pump is placed in fluid communication with the master cylinder to draw fluid from the reservoir of the master cylinder and deliver fluid to the inlet of the ABS pump. The pre-charge pump can be mounted to the master cylinder or at another location under the hood of the vehicle and is spaced from the ABS pump.

SUMMARY OF THE INVENTION

The present invention provides a first pump and a second pump integral with one another. The first pump can be an ABS pump and the second pump can be a pre-charge pump. The first and second pumps are driven in pumping motion by a common motor. A shaft of the motor can drive both the first and second pumps. For example, the first pump can be driven by an eccentric disposed on the shaft and the second pump can be driven directly by an end of the shaft.

In addition, the invention also provides that the second pump can direct fluid to an inlet of the first pump. The invention also provides a separate fluid line extending from a reservoir associated with the master cylinder to the inlet of the second pump. The first pump can receive fluid from another fluid source and the invention provides a valve for selectively closing the inlet of the first pump with respect to an outlet of the second pump. The invention also provides a by-pass fluid line and pressure by-pass valve disposed in parallel to the second pump. As a result, both pumps can be concurrently operated without clutches while fluid discharged from the second pump is directed away from the inlet of the first pump.

A third pump can operate similarly as the first pump and be disposed on an opposite side of the shaft with respect to the first pump. The third pump can also receive fluid from the second pump. The third pump can be driven in pumping motion by the eccentric.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout several views, and wherein.

DETAILED DESCRIPTION OF THE PREFERRED EMBODIMENT

Figure 1:
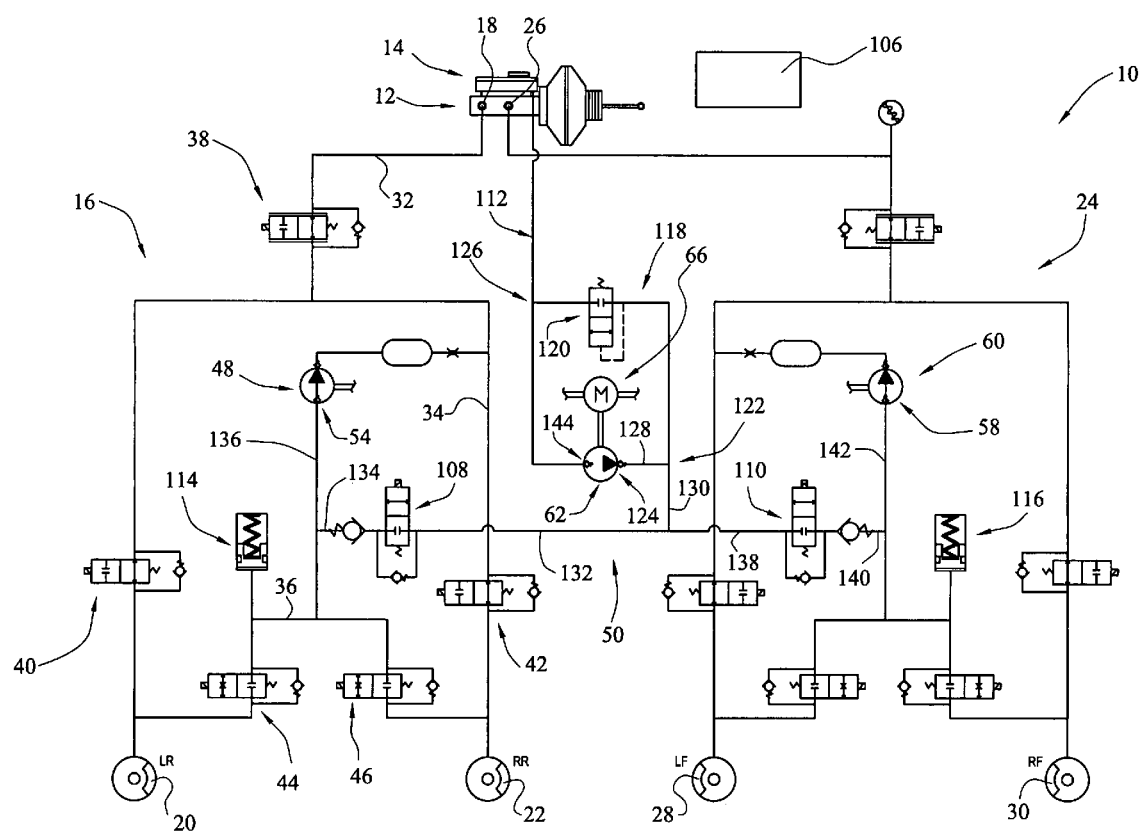
FIG. 1 is a schematic diagram of a braking system including a pump assembly according to the exemplary embodiment of the present invention.

Referring now to FIG. 1, in the exemplary embodiment of the invention, a braking system for a vehicle includes a pump assembly 10 for pumping fluid. The braking system also includes a master cylinder assembly having master cylinder 12 and a reservoir 14 in fluid communication with one another. A first hydraulic circuit 16 defines paths for fluid movement between a first port 18 of the master cylinder 12 and left and right rear brakes 20, 22. A second hydraulic circuit 24 defines paths for fluid movement between a second port 26 of the master cylinder 12 and left and right front brakes 28, 30.

The first hydraulic circuit 16 of the exemplary embodiment includes line portions, such as line portions 32, 34 and 36. A plurality of valves can be disposed along the first hydraulic circuit 16, such as an isolation valve 38, apply valves 40 and 42, and release valves 44 and 46. The first and second hydraulic circuit 16, 24 are constructed substantially similar to one another.

The pump assembly 10 includes a first pump 48 and a motor 66 for driving the pump 48 in pumping motion. The first pump 48 can communicate with the first hydraulic circuit 16, such as, for example, line portions 34 and 36. The pump 48 discharges pressurized fluid to the line portion 34 and can drawn fluid from the line portion 36. The pump 48 can be an anti-lock braking system or ABS pump operable to increase the pressure of brake fluid up to 200 bar.

The pump assembly 10 also includes a second pump 62. The pump 62 is integral with the pump 48 in that both pumps 48, 62 are driven in pumping motion by the motor 66. In the exemplary embodiment of the invention, the pump 62 is a pre-charge pump. The pump 62 can increase the fluid pressure of the fluid by 2–5 bars. A first fluid line 50 extends from an outlet 124 of the pump 62 to an inlet 54 of the first pump 48. The first fluid line includes line portions 128, 130, 132, 134, 136. The line portions 132, 134 and 136 cooperate to define a first branch of the first fluid line 50.

The pump assembly can also include a third pump 60. The third pump 60 can be substantially similar to the pump 48. For example, the pump 60 can be an anti-lock braking system or ABS pump operable to increase the pressure of brake fluid up to 200 bars. The first fluid line 50 can extend from the outlet 124 of the pump 62 to an inlet 58 of the third pump 60, over line portions 128, 130, 138, 140, 142. The pump 60 is driven in pumping motion by the motor 66. The line portions 128, 140 and 142 cooperate to define a second branch of the first fluid line 50.

Figure 2:
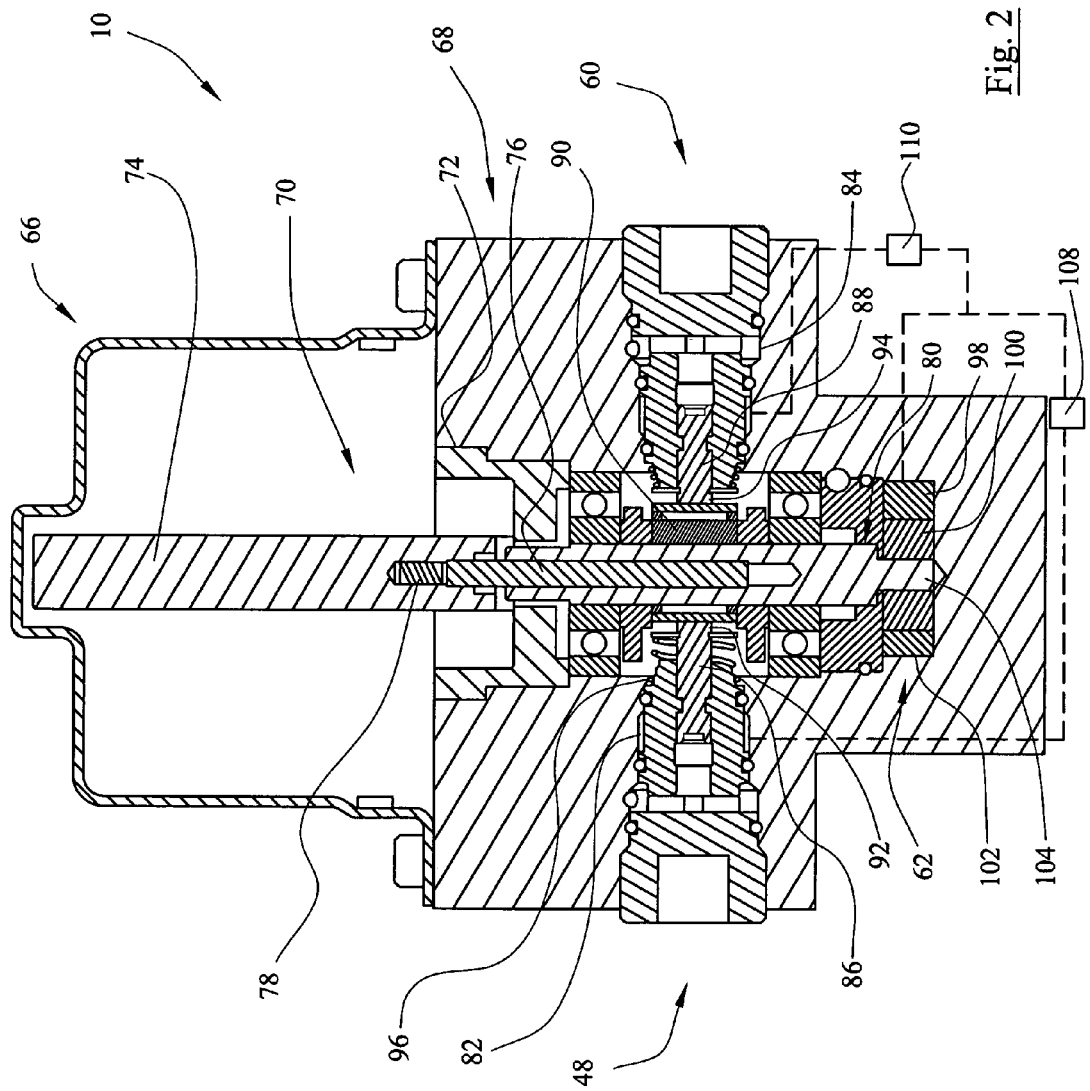
FIG. 2 is a cross-sectional, detailed view of the pump assembly shown schematically in FIG. 1.

Referring now to FIG. 2, the pump assembly 10 of the exemplary embodiment includes a block housing 68. The motor 66 and block housing 68 are bolted together. A shaft assembly 70 of the motor 66 can extend through a first aperture 72 defined by the block housing 68. The shaft assembly 70 includes a primary shaft 74 and a secondary shaft 76 engaged in telescoping relation to one another. The secondary shaft 76 rotates in response to rotation of the primary shaft 74 and can move longitudinally with respect to the primary shaft 74. A spring 78 can be disposed between the primary shaft 74 and the secondary shaft 76 to bias the secondary shaft 76 away from the primary shaft 74.

A sleeve member 80 is disposed in the aperture 72 of the block housing 68. Sleeve member 80 receives the secondary shaft 76. In particular, in the exemplary embodiment of the invention, the sleeve member 80 is engaged in telescoping relation with the secondary shaft 76. The sleeve member 80 rotates in response to rotation of the secondary shaft 76. The sleeve member 80 is substantially longitudinally fixed in the aperture 72.

Pump 48 is disposed in an aperture 82 defined by the block housing 68, adjacent a first side of the shaft 76. Pump 60 is disposed in an aperture 84 defined by the block housing 68, adjacent a second side of the shaft 76. The block housing 68 can define the inlets (not shown) of the pumps 48 and 60.

The pumps 48 and 60 can cooperate with the sleeve member 80 to pump fluid. For example, the pumps 48 and 60 can be driven to pump fluid in response to rotation of the sleeve member 80. Each of the pumps 48, 60 include pistons 86, 88 respectively, driven back and forth over a stroke length in response to rotation of the sleeve member 80. The sleeve member 80 defines an eccentric or cam portion 90 that engages cam follower portions 92, 94 of the pistons 86, 88, respectively. Each of the pump 48, 60 can include a spring, such as spring 96, to bias the respective pistons 86, 88 towards the cam portion 90 of the sleeve member 80.

The pump 62 also cooperates with the sleeve member 80 to pump fluid. For example, in the exemplary embodiment of the invention, the pump 62 is a gerotor pump. The pump 62 includes an outer member 98 and an inner member 100. The outer member 98 is disposed in an aperture 102 defined by the block housing 68. The aperture 102 extends parallel to the aperture 72 and is offset from the aperture 72. In other words, the axis of the aperture 102 is not coaxial with the axis of the aperture 72 in the exemplary embodiment of the invention.

Pumping chambers (not shown) are defined between the outer and inner members 98, 100. The inner member 100 is fixedly engaged to an end portion 104 of the sleeve member 80. The inner member 100 rotates in response to rotation of the sleeve member 80. The pump 62 pumps fluid in response to rotation of the inner member 100. The inlet and outlet (not shown) of the pump 62 are defined by the block housing 68.

Referring now to FIG. 1, during a controlled braking event according to the exemplary embodiment of the invention, the pump 62 can pump brake fluid to the pumps 48, 60. Fluid moves from the outlet 124 of the pump 62 along the first branch of the first fluid line 50 directly to the inlet 54 of the first pump 48, bypassing the master cylinder 12. Fluid moves from the outlet 124 of the pump 62 along the second branch of the first fluid line 50 directly to the inlet 58 of the third pump 60, bypassing the master cylinder 12. A controller 106 can direct a pair of prime valves 108, 110, which are disposed along the first fluid line 50, to move from a closed position to an open position. The valve 108 is disposed between line portions 132 and 134. The valve 110 is disposed between line portions 138 and 140.

The controller 106 can engage the motor 66 to rotate the shafts 74, 76 and sleeve member 80 (shown in FIG. 2) to drive the pumps 48, 60 and 62. The pump 62 will pump fluid to the pumps 48, 60, and the pumps 48, 60 will pump fluid to the brakes 20, 22 and 28, 30, respectively. The exemplary embodiment of the invention includes a second fluid line 112 extending from the reservoir 14 to an inlet 144 of the pump 62. The pump 62 will act as a suction pump and draw fluid to be pumped to the pumps 48, 60 from the reservoir 14 through the fluid line 112. The pump 62 can increase the pressure of the fluid 2–5 bars and direct the fluid to the inlets 54, 58 of the pumps 48, 60 respectively, through the valves 108, 110.

The controller 106 can monitor vehicle dynamics and braking system conditions and determine whether fluid should be directed to the pumps 48, 60 from the pump 62 or whether the pumps 48, 60 should draw fluid only from respective accumulators 114, 116. The controller 106 can make this determination based on control logic stored in the memory of the controller 106. If the controller 106 determines that fluid should not be directed to the pumps 48, 60 from the pump 62, the controller 106 can direct the prime valve 108, 110 to close.

The pump assembly 10 can continue to drive the pumps 48, 60 and 62 after the valves 108, 110 have been moved to the closed position. For example, the exemplary embodiment of the invention includes a third fluid line 118 and a pressure relief valve 120 disposed along the third fluid line 118. The fluid line 118 can extend from a point 122 along the first fluid line 50 adjacent the outlet 124 of the pump 62 to a point 126 along the second fluid line 112. When fluid pressure in the first fluid line 50, between the outlet 124 and the closed valves 108, 110 exceeds a predetermined amount, the pressure relief valve 120 will open and fluid will circulate between points 122 and 126.

While the invention has been described with reference to an exemplary embodiment, it will be understood by those skilled in the art that various changes may be made and equivalents may be substituted for elements of the exemplary embodiment without departing from the scope of the invention. In addition, many modifications may be made to adapt a particular situation or material to the teachings of the invention without departing from the essential scope thereof. Therefore, it is intended that the invention not be limited to the particular exemplary embodiment disclosed as the best mode contemplated for carrying out this invention, but that the invention will include all embodiments falling within the scope of the appended claims.

What is claimed is:

1. A pump assembly for pumping fluid comprising:
   a master cylinder assembly having a master cylinder and a reservoir;
   a motor having a rotatable shaft;
   an eccentric positioned on said shaft;
   a first pump disposed on a first side of said shaft and driven in pumping motion by said eccentric during rotation of said eccentric with said shaft;
   a second pump disposed at an end of said shaft and driven in pumping motion by said shaft;
   a first fluid line extending from an outlet of said second pump;
   a second fluid line extending between said reservoir and an inlet of said second pump;
   a third fluid line extending from said first fluid line adjacent said outlet to a position along said second fluid line between said reservoir and said inlet; and
   a pressure bypass valve moveable from a closed position to an open position in response to a predetermined fluid pressure in said first fluid line.

2. The pump assembly of claim 1 wherein said first pump is a piston pump operable to increase a fluid pressure up to two hundred bar and said second pump is a gerotor pump operable to increase a fluid pressure between two and five bars.

3. The pump assembly of claim 1 further comprising:
a first prime valve disposed along said first branch of said first fluid line between said first and second pumps; and
a second prime valve disposed along said second branch of said first fluid line between said second and third pumps.

4. A pump assembly for pumping fluid comprising:
a master cylinder assembly having a master cylinder and a reservoir;
a motor having a rotatable shaft;
first and second and third pumps driven to pump concurrently in response to rotation of said shaft;
a first fluid line extending from an outlet of said second pump and dividing into two branches, a first branch bypassing said master cylinder to extend directly to an inlet of said first pump and a second branch bypassing said master cylinder to extend directly to an inlet of said third pump;
a second fluid line extending between said reservoir and an inlet of said second pump;
a third fluid line extending from said first fluid line adjacent said outlet to a position along said second fluid line between said reservoir and said inlet; and
a pressure bypass valve moveable from a closed position to an open position in response to a predetermined fluid pressure in said first fluid line.

* * * * *